United States Patent [19]
Rubenstein

[11] 3,740,891
[45] June 26, 1973

[54] COMBINED FISHING LURE

[76] Inventor: Morris B. Rubenstein, 349 Gunston Hall Court, Hampton, Va. 23369

[22] Filed: May 3, 1972

[21] Appl. No.: 250,011

[52] U.S. Cl............................. 43/42.02, 43/42.15
[51] Int. Cl............................................. A01k 85/00
[58] Field of Search.................... 43/42.02, 42.15, 43/42.72

[56] References Cited
UNITED STATES PATENTS
2,932,112  4/1960  Graves, Jr.......................... 43/42.02
2,986,837  6/1961  Spugios.............................. 43/42.15
3,054,209  9/1962  Wiley, Jr............................ 43/42.02

Primary Examiner—Hugh R. Chamblee
Assistant Examiner—Daniel J. Leach
Attorney—Lowe & King

[57] ABSTRACT

A fishing lure utilizing the natural instinct of fish to strike a predator which is itself stalking prey including a leader lure, a follower lure, a bead device positioning the leader lure, and a spring-like coil of plastic monofilament line connecting said leader and follower lures to give the combined lure "life-like" action. The leader lure has a lengthwise passage through which the line passes and the hook is slidably attached to said monofilament line; the lure and hook being supported in place by said bead device. The monofilament line is wrapped around and through the bead device to support the leader lure in position and to provide "catch up" action by controlled slipping. The bead device is pulled back and forth over the monofilament line to form the connecting coil. The follower lure may be a spinning rod type bait having a floatable head and a flexible body giving the appearance of the predator and allowing casting the lure using a spinning/spin-cast type rod.

10 Claims, 6 Drawing Figures

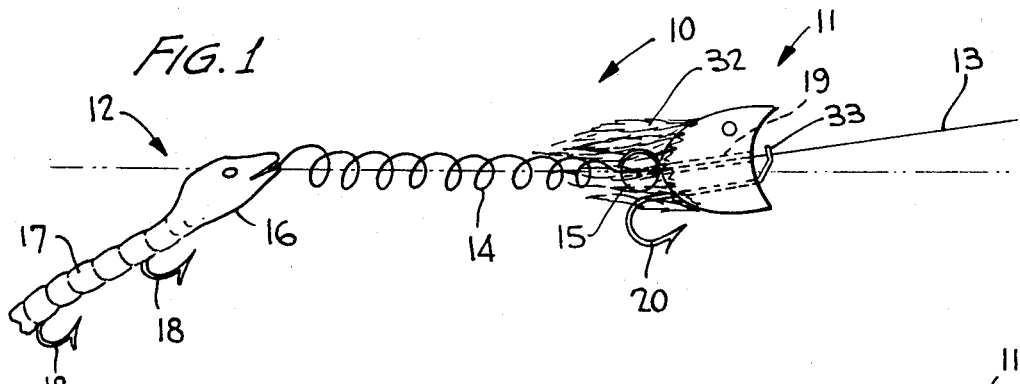
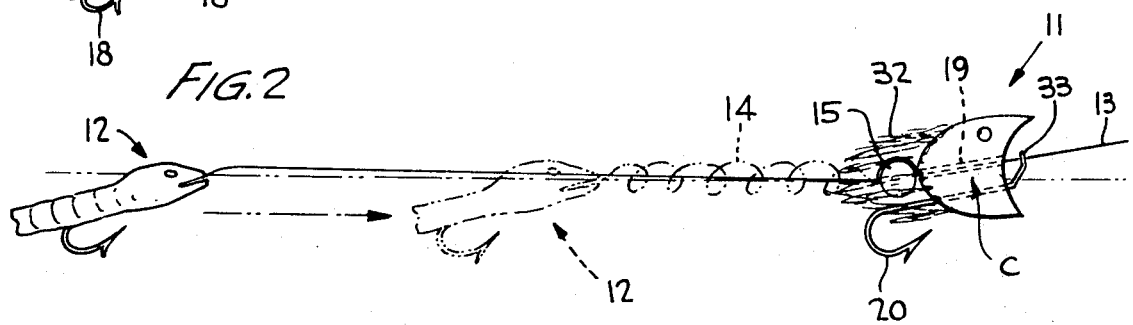
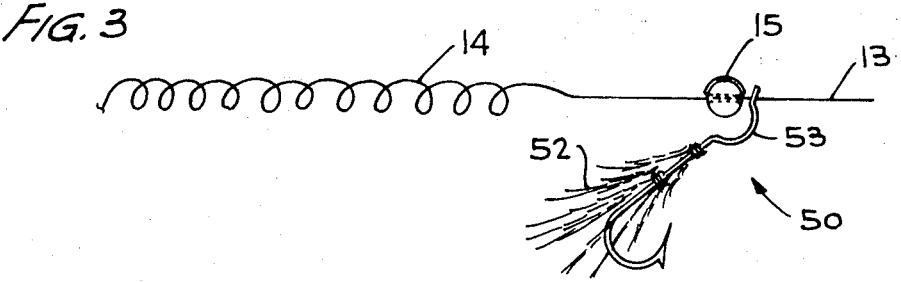
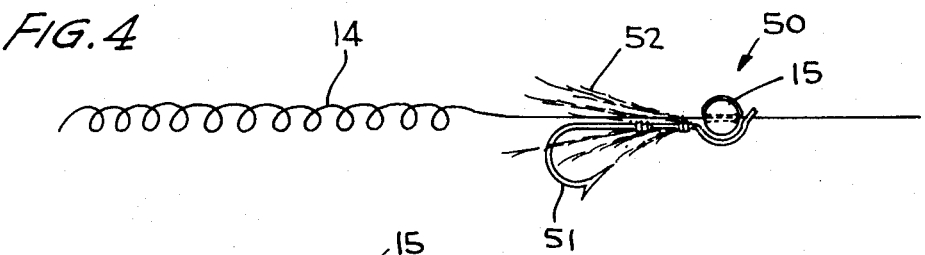
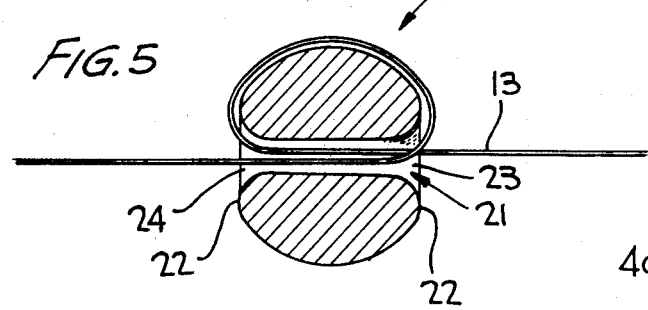
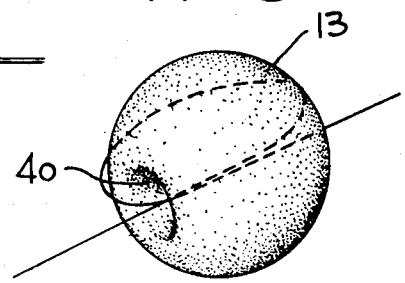

COMBINED FISHING LURE

The present invention relates to an improved fishing lure, and more particularly, to a fishing lure depicting "live action" to attract fish.

BACKGROUND OF THE INVENTION

Wildlife, and especially fish, must use stealth and cunning to find and capture food. These wildlife instinctively know that when another predator is in the pursuit of food, that predator is itself unwary, i.e., its "guard is down." This unwariness makes such a predator a good target.

There are a variety of fishing lures known which utilize the appearance of a predator actually capturing prey. Examples of this type of lure are Strite, U. S. Pat. No. 2,233,684 and Dale, U. S. Pat. No. 2,746,200. However, no lure has come to applicant's attention which gives the life-like appearance of a predator actually in the process of stalking and chasing prey. It is instinctively known to fish that once prey is captured, a predator once again becomes most wary and alert to its surroundings to protect itself. Thus, a drawback to an appearance of a capture, as in the prior art lures, is that such an appearance might, in some cases, actually repel fish rather than attract them.

Other lures simply utilize swimming movement to attract the attention of a fish. However, once the attention of the fish is attracted, the effectiveness of such lures is still dependent upon whether or not the fish believes that it will be successful in catching the prey off guard sufficiently to make the capture. Thus, the fish may or may not go for a lure, depending on how hungry it is, as well as capricious factors, all as is too well known to fishermen. The lure of the present invention combines the basic food value temptation to the fish with the usual attention attracting device of movement and then, further capitalizes upon the natural instincts of a fish to cause it to strike the lure when the same is in an unwary state, i.e., when the predator is in active pursuit of prey before the capture. Finally, the chance of securing two meals-in-one makes the combined lure too much to resist, thereby assuring a strike by the fish.

OBJECTIVES OF THE INVENTION

It is therefore a broad object of this invention to provide a fishing lure for sport fishermen which utilizes the natural instincts of a fish to strike at a predator that is stalking and/or chasing prey.

It is a further object of this invention to provide a combined fishing lure which will be attractive to a fish for its "live action" that gives an illusion that the wildlife represented by the lures is unwary being preoccupied by the simulated chase.

It is still a further object of this invention to provide a fishing lure which allows a variety of fly rod type bait and lures to be worked naturally with spinning/spin-cast type rods.

It is a further objective of this invention to provide a combined lure with only a coil of monofilament line between the leader and follower lures or baits thereby presenting an appearance of an ongoing, realistic chase.

It is a further objective of this invention to provide a bead device which is used to support the leader bait and to form a spring-like coil in the monofilament line.

SUMMARY OF THE INVENTION

The present invention provides a combined fishing lure simulating in a natural way a predator chase and stalking action thereby utilizing the natural instinct of a fish to strike a predator which is itself in the act of seeking food. The fishing lure comprises a leader lure or bait and a follower lure or bait interconnected solely by a coiled spring-like monofilament line. The line coil is lightweight, fly casting gauge plastic and substantially invisible in water to give the appearance of unconnected stalking predator and prey. Said leader bait may be in the form of a fish, fly, bug, popper, or any other lightweight fly rod-type bait. The follower bait may be in the form of a snake, eel, frog, or other heavy spinning/spin-cast type bait. Both lures or baits have hooks for making the catch. The forward lure is positioned by a frictional bead device at the desired point along the line in front of the follower lure.

The coil of monofilament line connecting the leader and follower baits forms an important feature of this invention. The coil causes the combined lure to present the appearance of a naturally occurring chase on the water as the lure is alternately relaxed, and pulled (or jerked) and relaxed again. The coil that is essentially invisible gives the lure of the invention the unmistakable appearance of an ongoing chase by (1) allowing the leader bait to move forward while the follower bait remains stationary, and (2) once fully extended, the spring action of the coil causes the follower bait to spring or dart after the leader bait, thereby giving the realistic appearance of a chase. Structurally speaking, the coil must be sufficiently resilient to provide a delay between the movement of the leader lure and the following movement (due to the spring action of the coil) of the follower lure. It has been found that monofilament nylon works properly under all conditions for the connecting coil of the lure. Applicant discovered that monofilament nylon of fly-casting size or larger can be easily given a coiled configuration by distorting the same with forced movement through a sharp angle, as will be discussed presently, and retains its coiled shape well under all normal conditions of tension and temperature.

A bead device on the monofilament line also forms an important feature of this invention by performing at least two functions. First, the leader bait is slidably attached to the monofilament line and must be supported in the desired position. The bead device performs this supporting function. This is accomplished by wrapping the monofilament line through a passage and around one side of the bead device and back through the passage, whereby the frictional interengagement holds the bead to the desired extent behind the leader bait thereby supporting the bait in the desired leading position.

The bead device may be used to control the movement of the leader bait back towards the follower bait as the leader is pulled through the water. By adjusting the tension of the monofilament line passing through said bead, the slow rearward movement of said leader bait (simulating the following lure catching up) may be selected in accordance with the length of retrieve expected and the desires of the fisherman. The initial position of the leader bait is also made adjustable with respect to the follower bait in accordance with the placement of the bead device.

When the bead device is pulled back and forth over the monofilament line under tension behind the leader bait, applicant has discovered that the sharp angle turning of the monofilament line looping around the bead naturally causes the formation of a coil. The monofilament line retains its coiled shape well and imparts the necessary springing and darting action to the following lure. When necessary, the original coil tightness may be reinstated by simply moving the bead over the coil while the line is under tension.

The leader bait attaches to the monofilament line by means of the lengthwise passage and is held in position by the bead device. The monofilament line passing through said passage allows smooth action of said leader bait on said line. A hook, passing through the leader bait, is slidably attached to the monofilament line.

The follower bait also fulfills requirements of this invention. First, said follower bait lends reality to the chase presented by the lure. The bait is in the form of a natural predator such as a snake or eel engrossed in a chase. Thus, said follower bait utilizes the natural instinct of a fish to strike at a predator whose "guard is down." Secondly, the follower bait adds weight to the lure, thereby allowing longer casts with a spinning rod than would be possible using only the leader lightweight fly rod type bait. This feature adds versatility to the lure.

A further important feature of this lure is the exploitation of the natural gluttonous and greedy nature of fish. If a feeding predator is too large to eat, the fish instinctively goes after and strikes at the stalked prey. Thus, a fish will strike at the leader bait in an attempt to take it away from the follower bait.

Still other objects and advantages of the present invention will become readily apparent to those skilled in this art from the following detailed description, wherein the applicant has shown and described only the preferred embodiment of the invention, simply by way of illustration of the best mode contemplated of carrying out the invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is a side view of the combined fishing lure showing the position of the lures or baits when the connecting spring coil of monofilament line is relaxed;

FIG. 2 is a side view of the fishing lure, partly in phantom, showing the forward darting of the leader lure and the charging action of the follower lure;

FIG. 3 is a side view of an embodiment of the leader bait;

FIG. 4 is a side view showing the action of an alternate embodiment of the leader bait;

FIG. 5 is a cross-sectional view of the bead device; and

FIG. 6 is a perspective view of the bead device of FIG. 5.

DETAILED DESCRIPTION OF THE PREFERRED EMBODIMENT

With reference to FIG. 1, the invention may broadly be described as a combined fishing lure, generally denoted by the numeral 10, comprising a leader lure or bait 11, a follower lure or bait 12, monofilament line 13, a coil of deformable line 14, connecting said leader and follower baits and a bead device 15. The follower bait 12 may include a floatable head 16 of cork or the like, flexible body 17 and a plurality of hooks 18, so as to be in the form of a predator, such as an eel or snake. The leader bait preferably comprises floatable body with a lengthwise passage 19 and hook 20.

The coil 14 provides the natural or "life-like" action required by the invention. To explain, this natural action is the presentation of the appearance of an ongoing alternate stalking, chasing sequence between predator and prey. The fish is enticed to strike at the follower bait 12 by capitalizing on the natural instinct of a fish to strike a predator that has its guard down, or if the predator itself is too large to eat, the natural gluttonous instinct of a fish will cause it to strike at the prey or leader bait 11.

As shown by the solid lines in FIG. 2, when line 13 is pulled taut, coil 14 also is extended, and, when line 13 is relaxed, the coil 14 by spring action resumes the coiled shape shown in phantom lines in FIG. 2, thereby simulating the alternate stalking (FIG. 1) and the chase (FIG. 2). Applicant has found lightweight monofilament plastic, such as nylon, to be the most suitable material for coil 14. Once coiled, monofilament nylon retains the coiled shape well under a wide variety of tension and temperature conditions.

By varying the length, number and tightness of the turns, as well as the gauge of the coil 14, the nature of the "chase" can be varied. Thus, depending upon the type of follower bait 12 used, the coil 14 can be designed to cause said follower bait 12 to spring forward at leader bait 11, or more simply, jerk forward at said leader bait 11. Also, by varying the number of turns and length of the coil 14, the leader bait 11 can be jerked forward with several small darts, as may be desired, before coil 14 is extended far enough to cause follower bait 12 to spring forward. As will be seen below, the number of coils can be varied between casts by means of the bead device 15.

The frictional holding ability of the bead device 15 may be varied to allow the forward lure 11 to move back a selected distance during each chase sequence (FIG. 2).

Thus, a longer chase before "capture" will result when coil 14 comprises a greater number of coils. As will be seen below, the number of coils in coil 14 may be varied between casts or as often as desired. The length of the total chase can thus be varied according to the type of bait being used for the leader and/or follower baits, the type of fish expected to be attracted by the lure, the clarity of the water or the length of an expected cast.

The monofilament line 13 and coil 14 provide a further feature of this invention. Heretofore, because of the design, lightweight lures such as flies, wet and dry, poppers, bugs, and spinners could be cast only short distances without the use of extra weights that are conspicuous and tend to prevent fish from hitting the lure under certain circumstances. It has been found by applicant that these lightweight lures can be cast much longer distances when normal lightweight line is replaced by monofilament line when using spinning and spin-cast type rods. Thus, provision of monofilament line 13 and coil 14 adds greatly to the versatility of the lure 10. Spinning/spin-cast type rods as well as fly rods are therefore amenable for use with the combined lure 10. The relatively heavy follower bait 12 further contributes to this feature as will be discussed below.

Referring now to FIGS. 5 and 6, bead device 15 will be discussed. Bead device 15 has a passage 21 through the center, smooth rounded edges 22 provided at both ends of said passage 21, entrance 23 and exit 24, respectively, at the ends of passage 21. After passing the monofilament line 13 through leader bait 11, said line 13 is inserted into bead device 15. Monofilament line 13 is passed into entrance 23, through passage 21, and out exit 24. The line 13 is then turned, wrapped or looped around one side of the bead device 15 and re-inserted into the entrance 23 and through passage 21. When the line 13 re-exits from exit 24, said line 13 is pulled out to any desired length.

After wrapping line 13 around and through the bead device, coil 14 is formed by slipping bead device 15 back and forth along line 13 behind leader bait 11 while the line is under tension. Smooth, rounded edges 22 prevent damage to line 13 as the bead device 15 is slipped back and forth along said line 13. However, the relatively sharp corners at the entrance and exit 23, 24 distresses the nylon line and causes it to curl. It is believed that the plastic nature of the nylon causes the stretching of the material along the outside of the coil 14 and compresses the material along the inside, thus permanently deforming the line.

Once coil 14 is formed, bead device 15, while monofilament line 13 is still wrapped around and through said device 15, is positioned behind leader bait 11 to hold said leader bait the desired distance ahead of follower bait 12. The amount of grip exerted by bead 15 on line 13 may be adjusted, thereby allowing leader bait 11 to slide backward as the lure is jerked through the water.

If no backward movement of leader bait 11 is desired, line 13 is wrapped tightly around the device 15 or looped several times about said device. On the other hand, if a relatively "fast capture" by follower bait 12 is desired, line 13 is strung loosely through bead 15. An embodiment of bead 15 allowing the "fast capture" would include a passage 21 having a large diameter. As can be realized, the diameter of passage 21 of bead 15 can also be varied according to the diameter of line chosen by the fisherman, as well as according to the chase conditions. This feature provides added realism to the lure since the predator (follower bait 12) appears to be gaining on and catching the prey (leader bait 11) as the two are pulled across or through the water.

By enlarging the size of cone on either side of bead 15, the grip exerted by the bead on the line 13 can be reduced to allow bait 11 to move even more rapidly backward toward bait 12 as the chase progresses. With a variety of beads having more or less conical recess depth, the fisherman is able to gain just the right amount of "chase action" desired.

Separate hook 20, shown in FIGS. 1 and 2, passes through the body of bait 11 and slidably attaches to line 13 in front of the bait 11 by means of eye 33. By allowing the hook 20 to attach to bait 11 in this manner, any rolling movement of bait 11 will impart like movement to hook 20. As hook 20 may be of bright or reflective material, any movement of hook 20 might cause a flash of light or shimmering effect. Such shimmering effect might well attract the attention of any otherwise unobservant fish. The friction between line 13 and hook 20 at the eye 33, also contributes to the smooth movement of leader bait 11.

Follower bait 12, as shown in FIG. 1, comprising floatable head 16, flexible body 17 and hooks 18, gives the appearance of a predator stalking and striking at prey, or leader bait 11. Floatable head 16 is constructed of cork or other floatable substance. Follower bait 12 fulfills at least two major functions in this invention. First, bait 12 is constructed of a material which allows said bait 12 to be heavier than bait 11. The bait 12 is a heavy spinning/spin-cast type bait, while bait 11 is a light fly rod type which would require special fly rod type equipment. Thus, the combination of a heavy spinning rod type bait with a light fly rod bait allows casting with a spinning/spin type cast rod. Secondly, bait 12 causes coil 14 to elongate when a cast is made, thereby allowing the lure to settle on or in the water in such a position that the lure 12 representing the predator begins the first sequence of stalking and chasing the prey immediately.

The leader bait 11 and follower bait 12 can both be of the floating variety, submerged variety, or a combination of the two. Thus, versatility is added to the invention because of the plurality of baits. The fisherman is thus able to choose the combination of floating and/or submerged type baits that best fits the surrounding conditions.

The floatable head 16 of the preferred follower bait 12 in combination with flexible body 17 provides realism to the lure. By being maintained in an essentially vertical position while leader bait 11 attempts to escape, the follower bait 12 presents the appearance of a predator stalking prey. Immediately before darting forward when coil 14 is in the elongated, taut position shown by the solid lines in FIG. 2, the follower bait 12 assumes an essentially horizontal position. This position shown in FIG. 2 presents a natural appearance of a predator positioning himself for an attack. The charge at leader bait 11 by follower bait 12 thus occurs in a similar manner as does an attack by a predator in nature.

Another embodiment of leader bait 11 is shown in FIGS. 3 and 4. The fly 50 comprises hook 51, bead device 15 and adornment 52. The fly 50 may be a wet or dry fly, or a spinner. Hook 51 has an offset neck 53 which fits around bead device 15 and the hook 51 is concealed in adornment 52, as shown in FIG. 4. The hook 51 is allowed to slowly swing downward with adornment 52 attached thereto after the lure has settled in the water, thereby attracting fish by such movement. Further movement of hook 51 results when fly 50 swings into an essentially horizontal position (FIG. 4) at the moment the lure 10 is pulled through the water. After the lure is relaxed, fly 50 will swing into a substantially vertical position (FIG. 3).

Other equally effective embodiments for the follower bait 12 may be fish, frogs, or the like. There are a wide variety of easily manufactured predator type follower baits which could be used depending upon the type of game the fisherman is searching for.

In action, the lure 10 may thus be described in terms of the actions of the fisherman:

a. Cast: When the lure 10 is cast, force on line 13 caused by the difference in weight between the heavy follower bait 12 and the lighter leader bait 11, pulls coiled line 14 into an elongated or straight position. The lightweight fly rod type lures in the leader position may be easily cast without weights added, using spinning/spin-cast type rods due to the relatively heavy weight of the lure in the rear or follower position.

b. Relax: As the lure 10 settles on or in the water, and the line 13 is relaxed, the coil 14 between leader bait 11 and follower bait 12 begins to re-form or contract naturally. As coil 14 is re-formed, follower bait 12 is gradually pulled forward by the stored spring energy toward the stationary leader bait 11; it being understood that the leader lure 11 is being held stationary by the fisherman through the line 13 to the rod. This action gives the appearance of a predator stalking and overtaking a prey thus taking advantage of the natural instinct of a fish to strike a predator whose "guard is down."

c. Pull: After coil 14 has fully re-formed, the next action is up to the fisherman. The fisherman smartly pulls the tip of his fishing rod. This pull (or jerk) causes the leader bait 11, which already has the appearance of being stalked, to dart or pop forward out of the reach of the predator or follower bait 12.

The length of coil 14 may be adjusted before a cast by means of bead device 15, to allow the leader bait 11 to dart forward a number of times without restraint. This action in some instances gives a more realistic appearance of a prey fleeing a predator. When the coil 14 is finally substantially fully extended, the rear lure 12 moves forward as if now charging the forward bait 11.

Thus, in summary, a combined fishing lure 10 has been developed from a study of feeding habits of fish and utilizes the natural instinct of fish to strike at a predator stalking prey. The lure 10 takes the form of the leader bait 11 and the follower bait 12 interconnected by a coil of monofilament line formed by pulling a bead device 15 over said line. A fish is enticed to strike at either predator or prey. The combination of a lightweight fly type bait, monofilament line and a heavy spinning/spin-cast type bait allows casting over greater distances and more accurately with conventional spinning and spin-cast rods than previously possible with only light fly bait.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A combined fishing lure utilizing the natural instinct of fish to strike a predator that is in the act of stalking prey comprising a leader lure, a follower lure and a coil of deformable line, said leader and follower lures being spaced apart and connected by said coil of line, said coil being sufficiently resilient to provide a delay between movement of said leader bait and a following movement by the spring action of said coil of said follower lure, said coil being relatively lightweight and substantially invisible in water to give the appearance of unconnected stalking predator and prey.

2. The combined fishing lure of claim 1, wherein is provided bead means on said line to limit the rearward travel of said leader lure along said coil, said bead means including a passage therethrough to accommodate two lengths of said line when looped around one side of said bead means.

3. The combined fishing lure of claim 2 wherein said line is looped through and around one side of said bead means to frictionally hold said bead means in position.

4. The combined fishing lure of claim 3 wherein said bead means is operative to form the coil of said deformable line by pulling said bead device back and forth along said monofilament line under tension.

5. The combined fishing lure of claim 3 wherein said deformable line is wrapped around said bead means sufficiently loosely to allow said leader bait to slide back towards said follower bait as the lure is pulled through the water.

6. The combined fishing lure of claim 4 wherein said bead means comprises rounded edges adjacent the passage to prevent damaging the line when said bead device is pulled along said line to form said coil.

7. The combined fishing lure of claim 1, wherein a hook is included on said leader bait and is loosely and slidably attached to said line to allow downward pivoting action when the line is relaxed.

8. The combined fishing lure of claim 7 wherein said hook includes an offset neck portion, a holding bead mounted on said line behind said hook, said neck portion mating with said bead to allow said hook to swing back to substantially horizontal position when the lure is pulled through the water.

9. The combined fishing lure of claim 1 wherein said line is monofilament line.

10. The combined fishing lure of claim 9 wherein said line is nylon.

* * * * *